(12) United States Patent
Suzuki

(10) Patent No.: US 7,460,091 B2
(45) Date of Patent: Dec. 2, 2008

(54) DISPLAY APPARATUS AND ELECTRONIC APPARATUS

(75) Inventor: Nobutaka Suzuki, Fujimi-cho (JP)

(73) Assignee: Seiko Epson Corporation, Tokyo (JP)

( * ) Notice: Subject to any disclaimer, the term of this patent is extended or adjusted under 35 U.S.C. 154(b) by 766 days.

(21) Appl. No.: 10/914,166

(22) Filed: Aug. 10, 2004

(65) Prior Publication Data

US 2005/0062693 A1 Mar. 24, 2005

(30) Foreign Application Priority Data

Sep. 24, 2003 (JP) .............................. 2003-331685

(51) Int. Cl.
*G09G 3/30* (2006.01)
(52) U.S. Cl. .............................. 345/76; 345/87; 349/96
(58) Field of Classification Search ............. 345/76–81, 345/87, 1.1, 1.3, 3.1; 349/56, 69, 76, 96
See application file for complete search history.

(56) References Cited

U.S. PATENT DOCUMENTS

| | | | | |
|---|---|---|---|---|
| 5,686,979 | A * | 11/1997 | Weber et al. .................. | 349/96 |
| 6,559,594 | B2 | 5/2003 | Fukunaga et al. | |
| 6,768,260 | B2 | 7/2004 | Fukunaga et al. | |
| 6,897,914 | B2 * | 5/2005 | Yoshida ........................ | 349/65 |
| 7,034,451 | B2 * | 4/2006 | Senbonmatsu .............. | 313/498 |
| 7,101,242 | B2 | 9/2006 | Fukunaga et al. | |
| 2001/0048405 | A1 | 12/2001 | Salley | |
| 2004/0001173 | A1 * | 1/2004 | Yamauchi ................... | 349/113 |
| 2006/0017380 | A1 | 1/2006 | Fukunaga et al. | |
| 2006/0038488 | A1 | 2/2006 | Fukunaga et al. | |
| 2007/0197118 | A1 | 8/2007 | Fukunaga et al. | |

FOREIGN PATENT DOCUMENTS

| | | | |
|---|---|---|---|
| CN | 1307442 A | | 8/2001 |
| JP | 56072419 A | * | 6/1981 |
| JP | A-56-072419 | | 6/1981 |
| JP | A-09-244061 | | 9/1997 |
| JP | B2 2836497 | | 10/1998 |
| JP | A-11-510948 | | 9/1999 |
| JP | A-11-287988 | | 10/1999 |
| JP | A-2000-020209 | | 1/2000 |
| JP | A 2001-85154 | | 3/2001 |
| JP | 2002372929 A | * | 12/2002 |
| JP | A-2002-372929 | | 12/2002 |
| JP | A-2004-095340 | | 3/2004 |
| JP | A-2004-311077 | | 11/2004 |
| JP | A-2004-354984 | | 12/2004 |
| JP | A-2005-038608 | | 2/2005 |
| JP | A-2005-070074 | | 3/2005 |
| WO | WO 97/07653 | | 2/1997 |

* cited by examiner

*Primary Examiner*—Chanh Nguyen
*Assistant Examiner*—Bao-Quan T Ho
(74) *Attorney, Agent, or Firm*—Oliff & Berridge, PLC

(57) ABSTRACT

Aspects of the invention can provide a display apparatus using a transparent EL element that can be viewed by a viewer from both sides of the light-emitting surface of the EL element, wherein the display apparatus displays clearly visible images. The display apparatus can include a sheet composed of an EL element having a light-emitting layer interposed between two opposing transparent electrodes. A light-emitting element emitting light from both sides of the sheet can be interposed between a pair of transparent substrate. A pair of polarizers arranged so that their polarization axes intersect can also be disposed on light-emitting surfaces of the light-emitting element.

4 Claims, 8 Drawing Sheets

F I G. 1
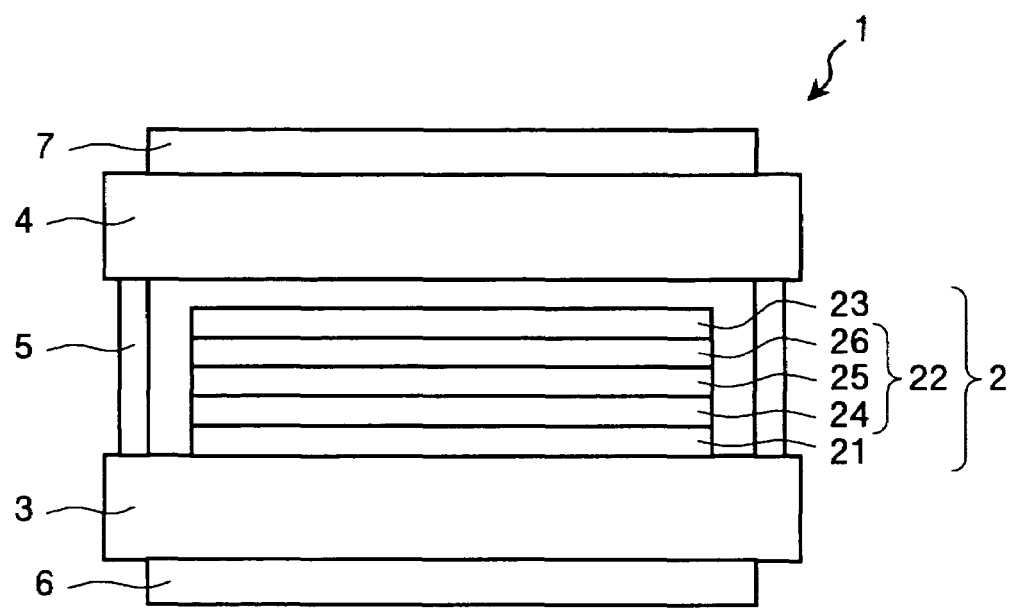

F I G. 2
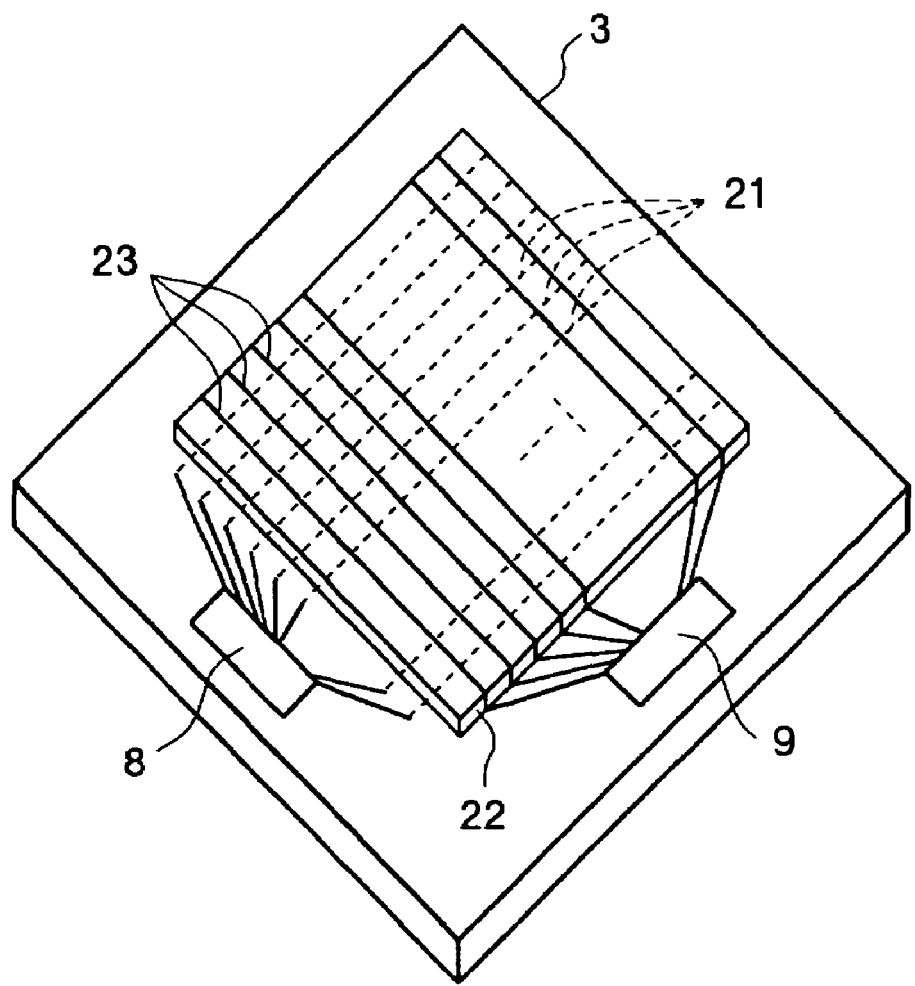

F I G. 3
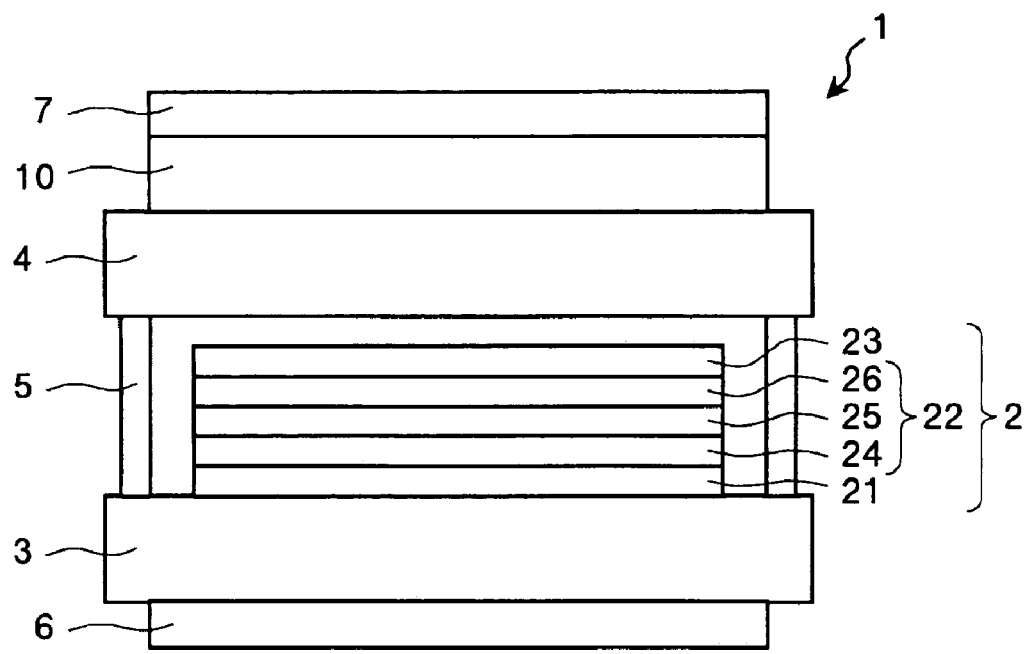

F I G. 6
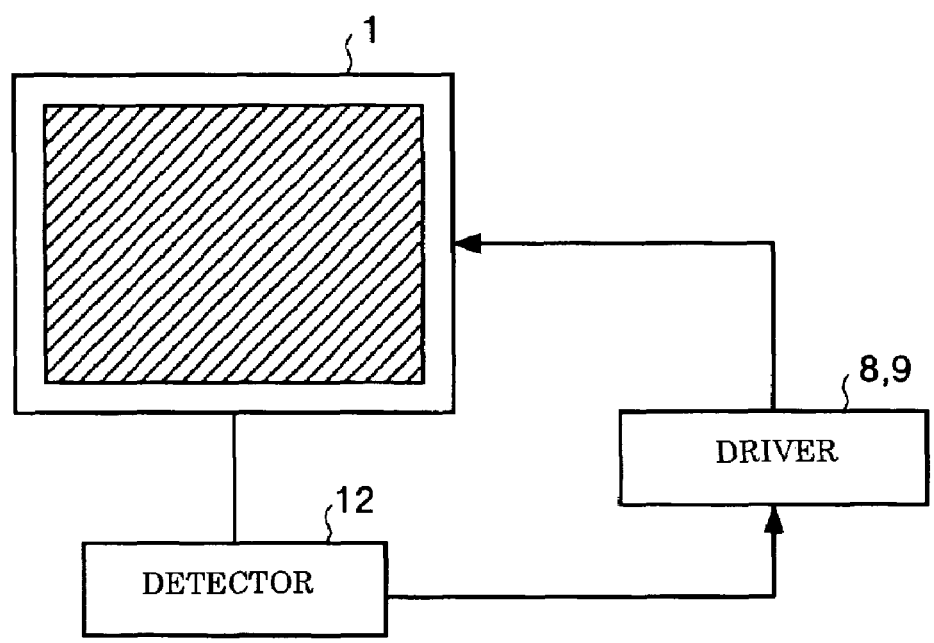

F I G. 7-2
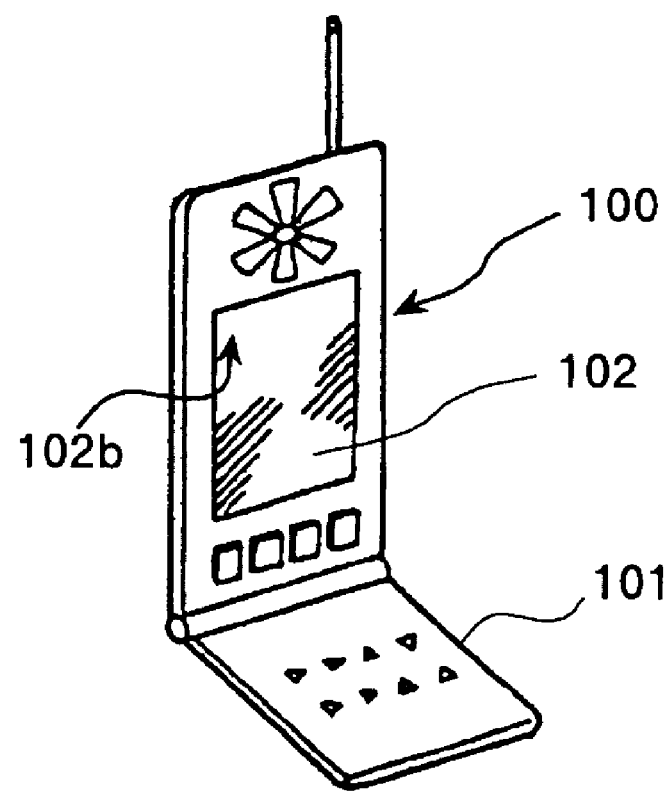

DISPLAY APPARATUS AND ELECTRONIC APPARATUS

BACKGROUND OF THE INVENTION

1. Field of Invention

Aspects of the invention relate to a display apparatus including an electroluminescent element and an electronic apparatus including the electroluminescent element.

2. Description of Related Art

Various related display apparatuses including an electroluminescent (hereinafter referred to as EL) element have been proposed. As a first related art, for example, an EL display is disclosed in, for example, Japanese Patent No. 2836497. This EL display can include a transparent front substrate having an EL element on the inner side and a back plate, fixed to the front substrate, having a colored transparent film maintained at a predetermined distance away from the inner surface with spacers. The EL display suppresses the transmittance of light entering the back plate so that images displayed by the light emitted from the EL element are easily visible from the front substrate.

As a second related art, a display including a fixed polarizing filter and a rotary disk polarizing filter, both having a light transmittance of 45%, disposed in sequence on a transparent EL panel having an EL element is disclosed in, for example, Japanese Unexamined Patent Application Publication No. 2001-85154. This display apparatus is capable of rotating the polarization direction of the rotary disk polarizing filter. The display apparatus continuously controls the amount (transmittance) of light transmitted from the back to the front of the transparent EL panel so that the light emitted from the EL element is easily visible from the front surface.

SUMMARY OF THE INVENTION

The displays according to the first and second related art can prevent or reduce degradation of the visibility of the light-emitting EL element due to the effect of external light entering from the back side, which is the opposite side from a viewer. A component for suppressing the transmittance is disposed on the back side, which is the opposite side from the viewer. More specifically, a back plate having a colored transparent film on the inner surface is used in the first related art, and two polarizing filters having a light transmittance of 45% disposed on the back surface are used in the second related art. Therefore, the display apparatus according to the first and second related art are formed on the assumption that the viewer always views the display from the front surface. Thus, it is difficult for the viewer to view the display from the back surface.

Aspects of the invention has taken into consideration the above-mentioned problem. The invention can provide a display using a transparent EL element that can be viewed from both light-emitting surfaces of the EL element and to provide an electronic apparatus including such EL element.

The exemplary display apparatus according to the invention can include an EL element having a light-emitting layer interposed between transparent electrodes further interposed between a pair of opposing transparent substrates and a pair of polarizers disposed on both exteriors of the EL element. The pair of polarizers are disposed so that their polarization axes intersect. In this way, the light transmitted through the display apparatus is entirely or partially absorbed by the pair of polarizers, and the light is emitted from both the first and second light-emitting surfaces of the light-emitting element (EL element). Therefore, when viewed from the first light-emitting surface, the background of the second light-emitting surface is not visible through the first light-emitting surface and the light-emitting portion of the light-emitting element can be clearly visible from both the first and second light-emitting surfaces.

The pair of polarizers of the display apparatus according to an exemplary embodiment of the invention can be disposed so that the polarization axes are substantially orthogonal. The polarization component of the light emitted from one of the polarizers differs from the polarization component of the light emitted from the other polarizer. In this way, the light transmitted through the display apparatus is blocked by the pair of polarizers. Thus, when viewed from the first light-emitting surface, the background of the second light-emitting surface is not visible through the first light-emitting surface, and the light-emitting portion of the light-emitting element can be even more clearly visible from both the first and second light-emitting surfaces.

According to the preferred embodiment, an EL element having a light-emitting layer interposed between transparent electrodes are further interposed between a pair of opposing transparent substrates, and a pair of polarizers is disposed on both exteriors of the EL element. Furthermore, a retardation layer can be interposed between the EL element and one of the polarizers. The direction of the polarization axes of the polarizers and the direction of the optical axis of the retardation layer are arranged at a predetermined angle. In this way, the light transmitted through the display apparatus is entirely or partially absorbed by the pair of polarizers and the retardation layer. Moreover, light from the light-emitting element is emitted from both the first and second light-emitting surface. Thus, when viewed from the first light-emitting surface, the background of the second light-emitting surface is not visible through the first light-emitting surface, and the light-emitting portion of the light-emitting element can be clearly visible from both the first and second light-emitting surfaces.

According to an exemplary embodiment of the invention, the polarization axes of the polarizers are arranged so that they are substantially parallel to each other. Even when the polarization axes of the pair of polarizers are arranged substantially parallel to each other, the light transmitted through the display apparatus can be entirely or partially blocked and the light emitted from the light-emitting element can be clearly displayed. As a result, in a case when the displayed image is unclear to the viewer because the directions of the polarization axes of the pair of polarizers differ, the polarization axes of the pair of polarizers can be disposed substantially parallel to each other to enable a clear display. For example, when a viewer of the display apparatus is wearing polarized sunglasses, the directions of the polarization axes of the pair of polarizers can be prevented from being arranged so that they are orthogonal to the polarization direction of the polarized sunglasses. Consequently, the display can be visible from both the first and second light-emitting surfaces even by a viewer wearing polarized sunglasses.

According to an exemplary embodiment of the invention, a polarization axis changing device for changing the polarization direction of the transmitted light can be disposed between at least one of the polarizers and the EL element. In this way, the vibration direction of the light transmitted through the pair of polarizers can be changed. As a result, the transmittance of the external light transmitted through the display apparatus or, in other words, the darkness of the background can be adjusted to control the visibility of the image displayed by the light-emitting element. For example, when an image is not displayed, the visibility of the background is increased by allowing external light to pass through the display apparatus, and, when an image is displayed, external light is blocked so that the light does not pass through the display apparatus. In this way, the visibility of the display is increased.

According to an exemplary embodiment of the invention, the polarization axis changing device for changing the polarization direction of the transmitted light can include an electro-optic element for rotating the polarization direction of the transmitted light by an electrical field. In this way, the polarization direction of light is rotated by an electro-optical element such as a liquid crystal molecule. As a result, the amount of external light transmitted through the display apparatus can be easily and accurately adjusted.

The display apparatus according to an exemplary embodiment of the invention can further include a detector for detecting a viewer of the display apparatus, drivers for switching the electrical current supplied to the transparent electrode for displaying images on a front surface which is one of the outer light-emitting surfaces detected by the detector. In this way, the detector detects on which side of the light-emitting surface of the display apparatus a viewer is present. Then, the drivers drive the light-emitting element so that images are displayed in accordance with the detected results. Consequently, images such as text and graphics having directionality can be displayed in a way legible to the viewer.

An electronic apparatus according to the invention can include the above-described display apparatus. For example, when the display apparatus according to the invention is installed to an electronic apparatus such as a cellular phone, since images can be displayed on both surfaces of an EL element both sides, the number of required components is reduced and, consequently, the cost is reduced. Moreover, the thickness can be greatly reduced. Since the visibility of the background can be adjusted to any level, images can be displayed in various ways and degradation in the visibility due to the influence of the background can be prevented.

While the invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. There are changes that may be made without departing from the spirit and scope of the invention.

BRIEF DESCRIPTION OF THE DRAWINGS

The invention will be described with reference to the accompanying drawings, wherein like numerals reference like elements, and wherein:

FIG. 1 is a cross-sectional side view of the outline structure of a display apparatus according to a first embodiment of the invention;

FIG. 2 is a schematic view of an example of the wiring of electrodes of the display apparatus;

FIG. 3 is a cross-sectional side view of the outline structure of a display apparatus according to a second embodiment of the invention;

FIG. 6 is an exemplary block diagram of the outline structure of a display apparatus according to the second embodiment of the invention; and FIGS. 7-1 and 7-2 illustrate electronic apparatus according to exemplary embodiments of the invention.

DETAILED DESCRIPTION OF PREFERRED EMBODIMENTS

A display apparatus according to preferred embodiments of the invention will be described in detail below by referring to the attached drawings. It should be understood that invention is not limited to these embodiments.

Figures 1, 7:
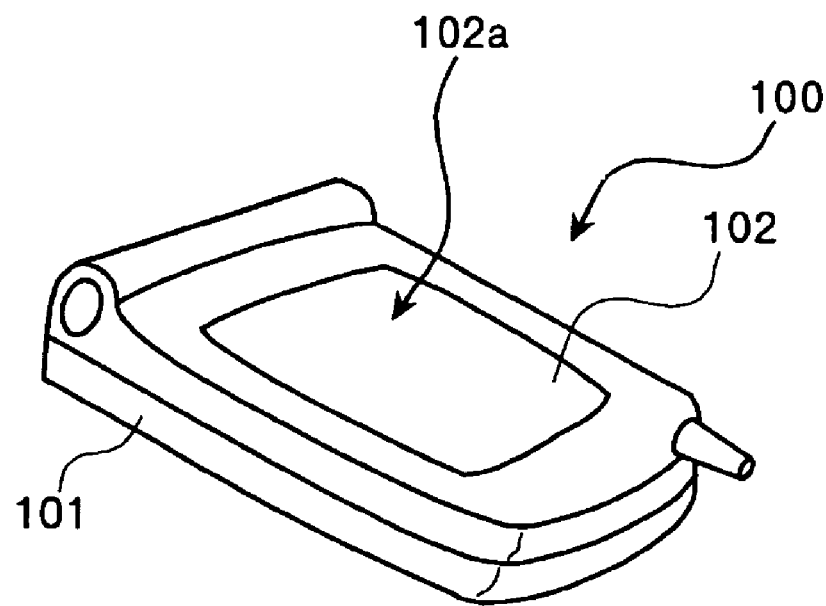

FIG. 1 is a cross-sectional side view of a first exemplary embodiment of a display apparatus according to the invention. A display apparatus 1 can include a light-emitting element 2, for emitting light to display images such as text and graphics, interposed between first and second transparent substrates 3 and 4. The transparent substrates 3 and 4 are bonded together with an adhesive 5. The sides of the first and second transparent substrates 3 and 4 opposite to the sides facing the light-emitting element 2, are bonded to first and second polarizers 6 and 7, respectively. The first and second polarizers 6 and 7 are arranged in blocking positions so that external light is not transmitted through the two polarizers 6 and 7.

The first and second transparent substrates 3 and 4 may be composed of any transparent material, such as various transparent glasses (e.g., quartz glass, borate glass, phosphate glass, phosphosilicate glass or silicate glass), various resins (e.g., polycarbonate, polyethylene terephthalate, or polyether sulfon), or transparent crystal substrates.

The light-emitting element 2 is generally constituted of a transparent anode 21, an organic thin film 22 including at least a light-emitting layer 25, and a transparent cathode 23. The light from the light-emitting layer 25 of the light-emitting element 2 having the above-mentioned structure is emitted from the surface facing the transparent anode 21 and the surface facing the transparent cathode 23. The transparent anode 21 and the transparent cathode 23 are formed by spattering or deposition by using a transparent conductive material such as indium tin oxide (ITO) or indium zinc oxide (IZO). In the case of FIG. 1, the transparent anode 21 is formed on the first transparent substrate 3 and the transparent cathode 23 is formed on an electron transport layer 26 of the organic thin layer 22 described below.

The organic thin layer 22 is formed of an organic EL element. The organic EL element is composed of the light-emitting layer 25 composed of fluorescent compounds and at least one of a hole transport layer 24 and the electron transport layer 26. In the case of FIG. 1, the organic thin layer 22 can include the hole transport layer 24, the light-emitting layer 25, and the electron transport layer 26. The organic thin layer 22 may be formed by film forming techniques, such as an inkjet method or a printing method, in addition to spattering or deposition.

When the organic thin layer 22 includes the hole transport layer 24, the hole transport layer 24 is disposed on the side of the light-emitting layer 25 facing the transparent anode 21. The hole transport layer 24 transfers holes to the light-emitting layer 25 and blocks electrons from moving from the light-emitting layer 25 to the hole transport layer 24. In FIG. 1, the hole transport layer 24 is formed on the transparent anode 21. The hole transport layer 24, for example, may be a thin film composed of a material such as N,N'-diphenyl-N, N'-dinaphthyl-1,1'-biphenyl-4,4'-diamine.

The light-emitting layer 25 is formed on the hole transport layer 24. The light-emitting layer 25 emits light by the energy generated when electrons from the transparent cathode 23 and the holes from the hole transport layer 24 recombine, as described below. The light-emitting layer 25, for example, may be composed of a polyfluorene polymeric derivative, a poly-paraphenylenevinylene derivative, a polyphenylene derivative, a polyfluorene derivative, polyvinylcarbazole, or a polythiophene derivative. When a colored image composed of text and graphics is displayed on the display apparatus 1, a material that causes the light-emitting layer 25 to emit light of the required color may be added. For example, for the light-emitting layer 25 to emit red light, Rhodamine, a DCM derivative, or Nile Red may be added to the components of the light-emitting layer 25. For the light-emitting layer 25 to emit green light, quinacridone or coumarin 6 may be added to the components of the light-emitting layer 25. For the light-emitting layer 25 to emit blue light, perylene or tetraphenylbutadiene may be added to the components of the light-emitting layer 25.

When the organic thin layer 22 includes the electron transport layer 26, the electron transport layer 26 can be formed on the side of the light-emitting layer 25 facing the transparent cathode 23. The electron transport layer 26 transfers electrons to the light-emitting layer 25 and blocks holes from moving from the light-emitting layer 25 to the electron transport layer 26. In FIG. 1, the electron transport layer 26 is formed on the light-emitting layer 25. The electron transport layer 26 may be composed of a material such as tris(8-hydroxyquinoline) aluminum (Alq3). The organic thin layer 22 may further include layers, such as a hole injection layer, for efficiently injecting holes to the light-emitting layer 25 composed of a material such as a composite of a polythiophene derivative (e.g., polyethylenedioxithiophene or polystyrene sulfonate), an aromatic amine derivative (e.g., TPD or α-TPD), MTDATA, copper phthalocyanine, a polyaniline derivative, a polythiophene derivative, and a phenylamine derivative, and an electron injection layer for efficiently injecting electrons to the light-emitting layer 25 composed of a material such as a diphenylquinone derivative, a nitro-substituted fluorene derivative, a thiopyrandioxide derivative, a anthraquinonedimethane derivative, heterocyclic tetracarboxylic anhydride (e.g., naphthaleneperylene), carbodiimide, an oxadiazole derivative, an anthrone derivative, a fluorenylidenemethane derivative, an anthraquinonedimethane derivative, an 8-quinolinol derivative, or other specific electron transport compounds.

The first and second polarizers 6 and 7 are for aligning the polarization direction of light in one direction and are a polarizing plate or a polarizing film. The first and second polarizers 6 and 7 are bonded to the first and second transparent substrates 3 and 4, respectively, with an adhesive. The polarization axes of the first and second polarizers 6 and 7 are arranged so that they are in blocking positions relative to each other such that external light is not transmitted from the first polarizer 6 to the second polarizer 7 or vice versa. In particular, when the first and second transparent substrates 3 and 4 are composed of, for example, glass, the light is mostly unaffected by birefringence of the substrates. Therefore, the first and second polarizers 6 and 7 are bonded to the first and second transparent substrates 3 and 4, respectively, so that the polarization axes are substantially orthogonal.

In FIG. 1, the transparent anode 21, the organic thin film 22, and the transparent cathode 23 are disposed on the first transparent substrate 3, in sequence. Then, on top of all of these, the second transparent substrate 4 is disposed. However, instead of the above-mentioned structure, the transparent cathode 23, the organic thin film 22, and the transparent anode 21 may be disposed on the first transparent substrate 3, in sequence, and, then, the second transparent substrate 4 may be disposed on top of all of these. Since the organic EL element is susceptible to moisture, a drying agent or getter material is usually added to the first and second transparent substrates 3 and 4 sandwiching the organic thin film 22, and the first and second transparent substrates 3 and 4 are firmly fixed together with an adhesive 5.

FIG. 2 is a schematic view of an example of the wiring of the electrodes of the display apparatus according to the invention. FIG. 2 illustrates only the light-emitting element 2 formed on the first transparent substrate 3 and drivers 8 and 9. As illustrated in FIG. 2, the transparent anode 21 is parallel stripes disposed on the first transparent substrate 3. The transparent cathode 23 is stripes disposed on the organic thin film 22 substantially orthogonal to the transparent anode 21. The plurality of intersecting points of the transparent anode 21 and the transparent cathode 23 on the organic thin film 22 forms pixel areas for displaying an image. The area defined by the plurality of pixel areas is a display area for displaying images, such as text and graphics. The stripes of the transparent anode 21 and the transparent cathode 23 are connected to the drivers 8 and 9, respectively, which are constituted of circuits for controlling the light emitted by the pixel areas. By the above-mentioned wiring, light emitted by each pixel area can be controlled. Thus, any image, such as text and graphics can be displayed by a group of dots. Units of pixel areas are made up by grouping pixel areas into which red (R), green (G), or blue (B) color agents have been added. By disposing a plurality of these units on the first transparent substrate 3, not only monochrome display, but also multi-color display becomes possible.

Next, the operation of the display apparatus 1 according to the invention is described. In a pixel area in which an electrical current controlled by the drivers 8 and 9 is applied to neither the transparent anode 21 nor the transparent cathode 23, or in a area in which an electrical current controlled by the drivers 8 and 9 is not applied to at least one of the transparent anode 21 or the transparent cathode 23, the first and second polarizers are disposed so that their polarization axes are in a blocking position, as described above. Thus, external light entering the display apparatus 1 is mostly absorbed and the background becomes invisible. Consequently, the display apparatus 1 has a black background. On the other hand, in the pixel area in which an electrical current controlled by the drivers 8 and 9 is applied to both the transparent anode 21 and the transparent cathode 23, light with an intensity corresponding to the amount of electrical current is emitted from the light-emitting layer 25. This light is emitted from both light-emitting surfaces of the light-emitting layer 25. In other words, light is emitted from the light-emitting layer 25 to the outside through the transparent anode 21, the first transparent substrate 3, and the first polarizer 6 and is also emitted from the light-emitting layer 25 to the outside through the transparent cathode 23, the second transparent substrate 4, and the second polarizer 7. In this way, light-emitting pixel areas are disposed on the black background not emitting light and, thus, an image created by the light-emitting pixel areas can be viewed clearly from the first and second polarizers 6 and 7.

In the description above, the first and second polarizers 6 and 7 are disposed so that their polarization axes are substantially orthogonal (so that they are in a blocking position), but the angle between the polarization axes is not limited to this. When the angle between the polarization axes of the two polarizers 6 and 7, whose incident surfaces are parallel to each other, is 0° (i.e., when the polarization axes are parallel to each other), the optical transmittance is the highest. As the angle between the polarization axes becomes greater, the optical transmittance decreases. Then, finally, when the angle between the polarization axes is 90° (i.e., when the polarization axes are orthogonal), the optical transmittance becomes substantially zero. Thus, the angle between the polarization axes of the two polarizers 6 and 7 can be adjusted so that the optical transmittance is at a level not degrading the visibility of the image displayed by the light-emitting layer 25.

According to the first exemplary embodiment, the display apparatus 1 can include the light-emitting element 2 interposed between the transparent substrates 3 and 4, wherein the anode and cathode on the light-emitting element 2 are composed of a transparent conductive material and drive the pixel area formed by the organic thin film 22 including the light-emitting layer 25. The transparent substrates 3 and 4 have the polarizers 6 and 7, respectively, whose polarization axes are arranged in a blocking position for the incident light. Therefore, images such as text and graphics can be clearly displayed on a black background and the images displayed on the display apparatus 1 can be viewed from both sides of the light-emitting surface of the display apparatus 1. Since the intensity of the light emitted from the light-emitting layer 25 is the same on both sides facing the first and second polarizers 6 and 7, the same display quality is attained when the light-emitting surface of the display apparatus 1 is viewed from the front or the back. Thus, both sides of the display apparatus 1 can be used for display.

FIG. 3 is a cross-sectional side view of the outline structure of the display apparatus according to a second exemplary embodiment of the invention. This display apparatus 1 has the same structure as the display apparatus illustrated in FIG. 1 according to the first embodiment but further includes a retardation plate 10 interposed between the first transparent substrate 3 and the first polarizer 6 or between the second transparent substrate 4 and the second polarizer 7. FIG. 3 illustrates the retardation plate 10 being interposed between the second transparent substrate 4 and the second polarizer 7. The retardation plate 10 is disposed so that external light does not pass through the first and second polarizers 6 and 7 even when the polarization axes of the first and second polarizers 6 and 7 are not arranged in the blocking position. Components illustrated in FIG. 3 that are the same as those illustrated in FIG. 1 are indicated by the same reference numerals.

Figure 4:
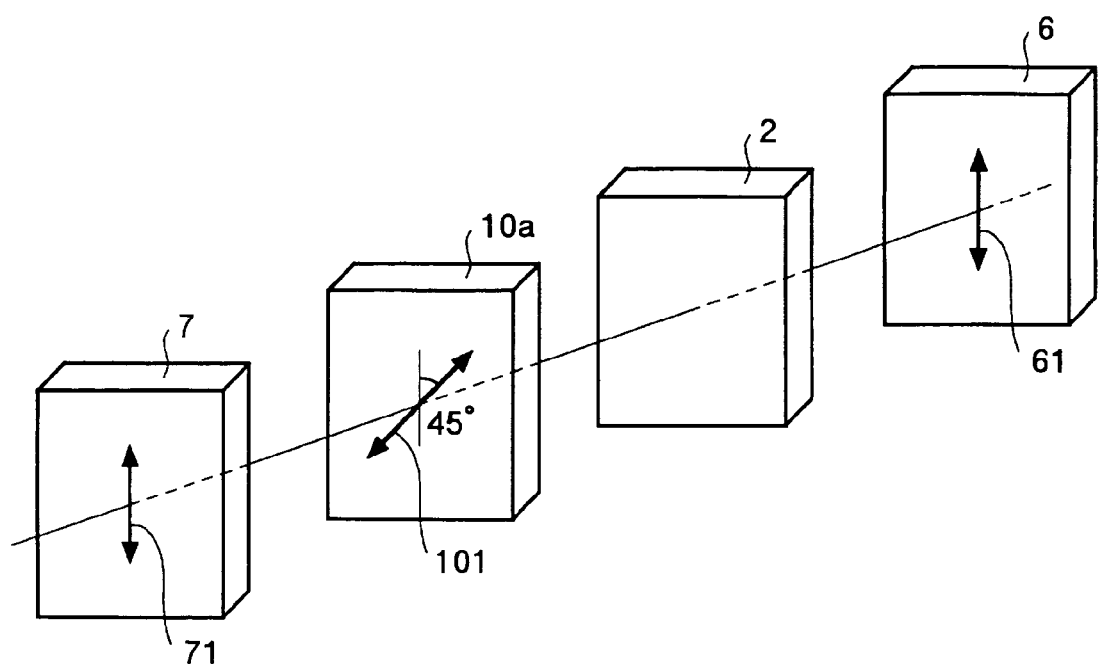
FIG. 4 illustrates the vibration direction of light in the display apparatus of FIG. 3.

The retardation plate 10 may be, for example, a ½ wave plate. When the linearly-polarized light enters the ½ wave plate at an angle of which the vibration direction and the optical axis of the ½ wave plate is θ°, the light is retarded by half a wavelength and linearly-polarized light with a vibration direction rotated by 2×θ° is emitted. FIG. 4 illustrates the directions of the polarization axes of the first and second polarizers and the direction of the optical axis of the ½ wave plate of FIG. 3, in which a ½ wave plate is used as the retardation plate. In FIG. 4, the polarization axes of the first and the second polarizers 6 and 7 are parallel. In this case, a ½ wave plate 10a is disposed so that its optical axis 101 is tilted 45° relative to polarization axes 61 and 71 of the first and second polarizers 6 and 7, respectively. In this way, light passing through the first and second polarizers 6 and 7 can be blocked by the above-mentioned characteristics of the ½ wave plate 10a. More specifically, in this arrangement, the ½ wave plate 10a rotates the vibration direction of the linearly-polarized light entering the ½ wave plate 10a by 90° after the linearly-polarized light passes through the first or second polarizer 6 or 7.

The operation of the display apparatus 1 having such a structure will be described. First, external light transmitted through the display apparatus 1 will be described. Among the external light entering from the first polarizer 6, only the polarized light vibrating in the same direction as the polarization axis of the first polarizer 6 passes through the first polarizer 6. The light that has passed through the first polarizer 6 enters the retardation plate (½ wave plate) 10. As described above, after the linearly-polarized light enters the retardation plate (½ wave plate) 10, the polarization direction of the linearly-polarized light is rotated 90° with respect to the polarization direction of the linearly-polarized light before entering the retardation plate (½ wave plate) 10. Then, the linearly-polarized light is emitted from the retardation plate (½ wave plate) 10. Subsequently, the linearly-polarized light passes through the transparent light-emitting element 2 and enters the second polarizer 7. The linearly-polarized light, however, is absorbed since it cannot pass through the second polarizer 7 because the polarization axis of the second polarizer 7 and the vibration direction of the linearly-polarized light are orthogonal. Thus, even for the second embodiment, the background of the display apparatus 1 is not visible although the polarization axes of the first and second polarizers 6 and 7 are parallel. Similarly, when external light enters from the second polarizer 7, the vibration direction of the linearly-polarized light that has passed through the retardation plate 10 is the same as the polarization axis of the first polarizer 6. Thus, the linearly-polarized light cannot pass through the first polarizer 6. Consequently, in this case, too, the background of the display apparatus 1 is not visible.

Next, the transmission of light emitted from the light-emitting element 2 of the display apparatus 1 will be described. When pixel areas of the light-emitting element 2 entirely or partially emit light by being controlled by a driving current from drivers, light is emitted to both the first and second polarizers 6 and 7. The light emitted to the first polarizer 6 passes through the retardation plate (½ wave plate) 10. Only light having a vibration direction that is the same as the polarization axis of the first polarizer 6 is transmitted through the first polarizer 6 and is emitted to the exterior of the display apparatus 1. The pixel areas that do not emit light are black, the same as in the above-mentioned case wherein external light is blocked. Thus, the colors of the emitted light are clearly displayed by the light-emitting element 2. The light emitted to the second polarizer 7 is emitted to the outside, similarly to the case in the first exemplary embodiment. In this case, too, the colors of the emitted light are clearly display by the light-emitting element 2 in contrast with the black background not emitting light.

In FIGS. 3 and 4, a ½ wave plate is used as the retardation plate 10. It should be understood that the retardation plate 10, however, is not limited to this, and any retardation plate that can generate a predetermined phase difference may be used.

According to the second exemplary embodiment, the polarization axes of the pair of polarizers 6 and 7 that sandwich the light-emitting element 2 are arranged in parallel and the retardation plate 10 having an optical axis that prohibits light from passing through the pair of polarizers 6 and 7 is interposed between one of the polarizers 6 and 7 and the light-emitting element 2. In this way, polarized light having the same vibration direction is emitted from both the front and the back of the light-emitting element 2. Since the colors of the emitted light from the light-emitting layer 25 are displayed on a black background, the display apparatus 1 clearly displays images.

When the display apparatus 1 according to the first exemplary embodiment is viewed through polarized sunglasses having a polarization axis in the same direction as one of the polarization axis of the polarizer 6 or 7 according to the first exemplary embodiment, light having a polarization axis in this same direction emitted from one of the polarizers is visible, but light emitted from the other polarizer will be invisible. For the display apparatus 1 according to the second embodiment, however, the displayed image can be viewed on both sides of the display apparatus 1 even through polarized sunglasses since the light-emitting element 2 is interposed between the two polarizers 6 and 7 having polarization axes in the same direction as the direction of the polarization axis of the polarized sunglasses.

Figure 5:
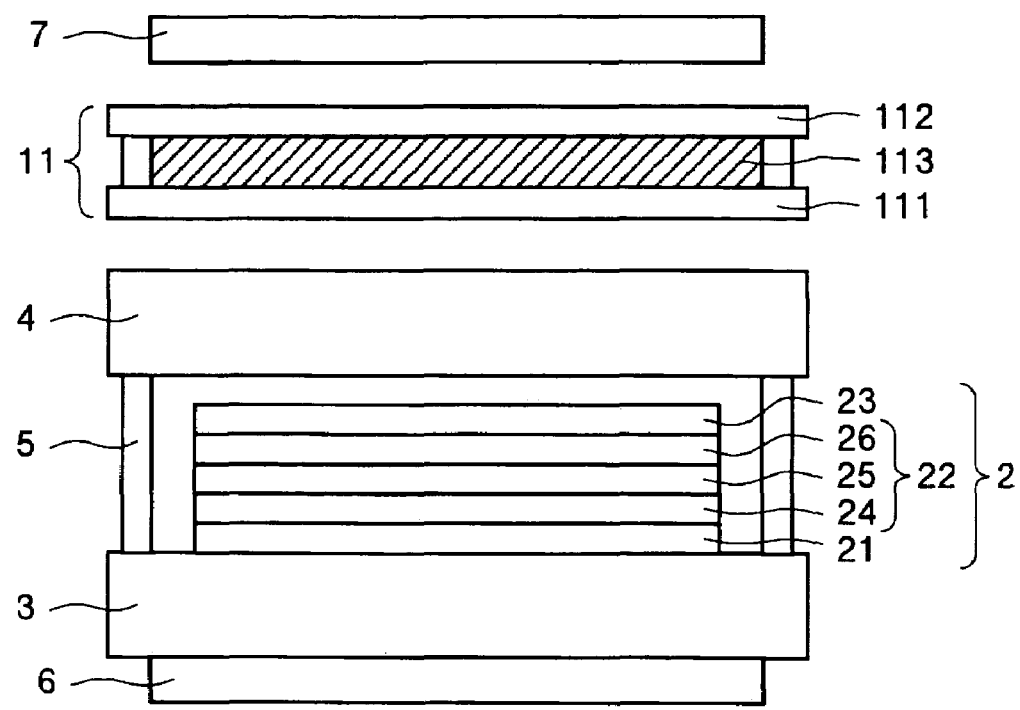
FIG. 5 is a cross-sectional side view of the outline structure of a display apparatus according to a third embodiment of the invention.

FIG. 5 is a cross-sectional side view of the outline structure of a display apparatus according to a third exemplary embodiment of the invention. This display apparatus 1 according to the third exemplary embodiment has the same structure as the display apparatus illustrated in FIG. 1 according to the first embodiment but further includes a polarization axis changer 11 for changing the transmission state of light by rotating the polarization direction between the first transparent substrate 3 and the first polarizer 6 or between the second transparent substrate 4 and the second polarizer 7. The polarization axis changer 11 may be an electro-optical element in which the polarization direction changes by applying an electrical field. In FIG. 5, a liquid crystal element used as the polarization axis changer 11 is interposed between the second transparent substrate 4 and the second polarizer 7. The liquid crystal element is formed by sealing liquid crystal molecules 113, such as twisted nematic (TN) liquid crystal, between two glass substrates 111 and 112 having transparent electrodes. When an electric field is not applied (hereinafter this state is referred to as an 'off' state), the liquid crystal molecules 113 are twisted such that the alignment direction of the liquid crystal molecules close to the second polarizer 7 is the same as the direction of the polarization axis of the second polarizer 7, and the alignment direction of the liquid crystal molecules on the other side is the same as the direction of the polarization axis of the first polarizer 6. When an electric voltage is applied (hereinafter this state is referred to as 'on' state), the liquid crystal molecules are aligned vertically to the substrate since the longitudinal axis of the liquid crystal molecules is aligned in parallel with the direction of the electric field because of the dielectric constant anisotropy of the liquid crystal molecules. In the third embodiment, two polarizers are disposed such that their polarization axes are orthogonal (crossed Nicol arrangement).

Next the operation of the display apparatus 1 having a liquid crystal element as a polarization axis changer 11 is described. Based on the assumption above, when an electric field is applied to the liquid crystal element while it is on, the longitudinal axis of the liquid crystal molecules 113 is aligned in parallel to the direction of the electrical field and vertical to the surface of the substrate, and the liquid crystal becomes optically uniform. Thus, light entering the first polarizer 6 (or 7) of the display apparatus 1 intersects the polarization axis of the second polarizer 7 (or 6) and is absorbed. As a result, the light is blocked and the background becomes invisible, as described in the first embodiment. Based on the assumption above, when the liquid crystal element is off, the light entering from the first polarizer 6 (or 7) passes through the liquid crystal element. When the light passes through the liquid crystal element, its vibration direction is rotated 90° and becomes the same as the direction of the polarization axis of the second polarizer 7 (or 6). As a result, the light is transmitted and the background becomes transparent.

By adjusting the voltage applied to the liquid crystal element between the on and off states of the liquid crystal element, the light can be continuously switched between a light-transmitting state and a light-blocking state. In this way, the darkness of the background can be adjusted. When an image is displayed by the light emitted from the light-emitting element 2 of the display apparatus 1 having a liquid crystal element operating as described above, a voltage close to a value that turns on or off the liquid crystal element may be applied to maintain the visibility while the background is black or while the image is displayed. When an image is not displayed by emitting light from the light-emitting element 2, the background can be visible.

In the above, the two polarizers 6 and 7 were in the crossed Nicol arrangement. When the polarization axes of the two polarizers 6 and 7 are parallel (parallel Nicol arrangement), opposite to the crossed Nicol arrangement, light passes through when the liquid crystal elements are on and light is blocked when the liquid crystal elements are off. In the above, the polarization axis changer 11 was further included in the display apparatus 1 according to the first embodiment. The polarization axis changer 11 may be further included in the display apparatus 1 according to the second exemplary embodiment.

To put the entire liquid crystal element into a uniform state, the electrodes must be disposed on all areas where there are liquid crystal molecules. However, the electrodes may be selectively disposed, and some of the electrodes may be switched between a light-transmitting state and a light-blocking state. In this case, the liquid crystal element in a predetermined position may be switched between the light-transmitting state and the light-blocking state by connecting a liquid crystal element driver (not depicted in the drawings) to the electrodes arranged in a dot matrix.

Moreover, as a liquid crystal mode, a birefringence mode may be used in addition to a TN mode applying optical rotation. In this case, if the dielectric constant anisotropy of the liquid crystal molecules is $\Delta n$, the thickness of the liquid crystal element is d, and the wavelength of the light entering the liquid crystal element is $\lambda$, the linearly-polarized light can be rotated by 90° by setting $\Delta n \cdot d$ to $\lambda/2$ and setting the angle between the alignment direction of the liquid crystal molecules and the polarization axes of the polarizers 6 and 7 to substantially 45°. In this way, similar to the above-mentioned TN mode, the light-transmitting state and light-blocking state can be switched.

According to the third exemplary embodiment, to not display an image on the display apparatus 1, the liquid crystal element is adjusted such that the display apparatus 1 is in a light-transmitting state. On the other hand, to display an image on the display apparatus 1, the liquid crystal element is adjusted by the polarization axis changer 11 such that the display apparatus 1 is in a light-blocking state or not in a light-transmitting state. Because of this structure, the display apparatus 1 clearly displays an image. Furthermore, by switching the display apparatus 1 into a light-transmitting state when an image is not displayed, the display apparatus 1 may be used in a window for observing the external environment being separated by the window. Moreover, the background can be adjusted to a predetermined darkness by the polarization axis changer 11 instead of by the angle of the polarization axes of the two polarizers 6 and 7.

FIG. 6 is an exemplary block diagram of the outline structure of a display apparatus according to a fourth exemplary embodiment of the invention. In this fourth embodiment, the display apparatus 1 described in the first to third embodiments further includes detectors 12 for detecting the side on which a viewer is present. Moreover, the drivers 8 and 9 set the surface detected by one of the detectors 12 as the front surface and switch the display of images, such as text and graphics. In the fourth embodiment, the 'front surface' refers to the surface that displays text and graphics having directionality in a legible way, and the 'back surface' refers to the surface that displays text and graphics having directionality in a way so that they appear reversed.

The detectors 12 detect on which side of the light-emitting surfaces of the light-emitting element 2 the viewer is present and outputs the result to the drivers 8 and 9. As a detector sensor for detecting a viewer, for example, a pyroelectric sensor or an infrared sensor may be used. The detectors 12 are provided on either the first or second polarizer 6 or 7 or on both.

The drivers 8 and 9 control the display data to display images such as text and graphics so that the surface detected by the detectors 12 becomes the front surface. For example, when the display apparatus 1 is initially set to display images such that the side of the first polarizer 6 is the front surface, to change the front surface to the surface on the side of the second polarizer 7, the display data for the images to be displayed is sent to the light-emitting element 2 and the left and right is reversed.

When the detectors 12 detect a viewer on both surfaces of the display apparatus 1, the drivers 8 and 9 define the surface having whichever one of the detectors 12 that has detected the viewer first as the front surface and displays images accordingly. When both of the detectors 12 on both sides of the display apparatus 1 simultaneously detect viewers on both sides, the drivers 8 and 9 may define a predetermined surface as the front surface. Moreover, the display apparatus 1 may be designed so that the viewer can select the front surface.

The display apparatus 1 according to the fourth embodiment includes the detectors 12 for detecting on which side of the light-emitting surfaces of the display apparatus 1 a viewer is present and the drivers 8 and 9 for controlling the display data so that the detected surface becomes the front side. In this way, images such as text and graphics having directionality can be displayed in a way that is always legible to a viewer.

In the above-described first to fourth exemplary embodiments, an organic EL element was used as the light-emitting element 2. An inorganic EL element, however, may also be used as the light-emitting element 2.

An electronic apparatus according to an embodiment of the invention will be described. FIGS. 7-1 and 7-2 illustrate examples of cellular phones using a display apparatus according to the invention. A folded state and an opened state of a cellular phone 100 according to an embodiment of a display apparatus according the invention are illustrated in FIGS. 7-1 and 7-2, respectively. The cellular phone 100 includes a body 101 and a display body 102.

The above-mentioned display apparatus is disposed inside the display body 102. Because of this structure, a front display surface 102a for displaying images on the display body 102 in the folded state and a back display surface 102b for displaying images on the display body 102 at the opened state are visible. The above-mentioned cellular phone 100 switches the display by sensing the display surface using a sensor in accordance with various operations and conditions and, in particular, the change between the folded state and opened state.

For such a display, a related cellular phone requires a display apparatus on both the front and back surfaces. However, according to the invention, only one display apparatus is required for displaying images on both the front and back surfaces. In this way, the thickness is greatly reduced and the number of required components is reduced. Consequently, the weight and cost can be reduced.

As described above, the display apparatus according to the invention is useful for a display apparatus that can be viewed from both sides and an electronic apparatus having the display apparatus. More specifically, it is suitable for a display apparatus for displaying images on a transparent member such as a window.

What is claimed is:

1. A display apparatus, comprising:
a pair of opposing transparent substrates;
transparent electrodes interposed between the transparent substrates;
an EL element having a light-emitting layer interposed between transparent electrodes and between the transparent substrates, the EL element being capable of selectively displaying images;
a pair of a first polarizer and a second polarizer sandwiching the EL element therebetween, the first polarizer and the second polarizer being disposed so that their respective polarizing axes intersect; and
a liquid crystal display apparatus including a liquid crystal element interposed between the first polarizer and the EL element, wherein
while the EL element displays images, the liquid crystal display apparatus adjusts the liquid crystal element so that polarized light from the second polarizer is absorbed by the first polarizer, and
while the EL element does not display images, the liquid crystal display apparatus adjusts the liquid crystal element so that polarized light from the second polarizer passes through the first polarizer.

2. The display apparatus according to claim 1, the pair of the first polarizer and the second polarizer being disposed so that the polarizing axes are substantially orthogonal.

3. The display apparatus according to claim 1, a polarization component of light emitted from the first polarizer differing from a polarization component of the light emitted from the second polarizer.

4. The display apparatus according to claim 1, further comprising:
a detector that detects a viewer viewing the display apparatus on at least one of the sides of the EL element; and
a driver that switches an electrical current supplied to the transparent electrodes for displaying images on an outer light-emitting surface which is detected and determined to be a front surface by the detector.

* * * * *